US011498550B2

United States Patent
Watanabe (10) Patent No.: US 11,498,550 B2
(45) Date of Patent: Nov. 15, 2022

(54) VEHICLE CONTROL DEVICE

(71) Applicant: Toyota Jidosha Kabushiki Kaisha, Toyota (JP)

(72) Inventor: Ryochi Watanabe, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 488 days.

(21) Appl. No.: 16/692,707

(22) Filed: Nov. 22, 2019

(65) Prior Publication Data
US 2020/0164869 A1 May 28, 2020

(30) Foreign Application Priority Data
Nov. 26, 2018 (JP) .............................. JP2018-220126

(51) Int. Cl.
*B60W 30/02* (2012.01)
*B60W 40/068* (2012.01)
*B60W 10/06* (2006.01)

(52) U.S. Cl.
CPC ............ *B60W 30/02* (2013.01); *B60W 10/06* (2013.01); *B60W 40/068* (2013.01); *B60W 2520/105* (2013.01); *B60W 2552/40* (2020.02); *B60W 2710/0666* (2013.01)

(58) Field of Classification Search
CPC .... B60W 30/02; B60W 10/06; B60W 40/068; B60W 2520/105; B60W 2552/40; B60W 2710/0666
See application file for complete search history.

(56) References Cited

U.S. PATENT DOCUMENTS

| | | | |
|---|---|---|---|
| 5,351,779 A * | 10/1994 | Yamashita | B60K 28/16 180/197 |
| 6,205,374 B1 * | 3/2001 | Kijima | B60G 17/016 701/1 |
| 2007/0193802 A1 * | 8/2007 | Hu | B60K 28/16 180/197 |

(Continued)

FOREIGN PATENT DOCUMENTS

| | | |
|---|---|---|
| JP | S63-018146 A | 1/1988 |
| JP | 2008-094150 A | 4/2008 |

(Continued)

*Primary Examiner* — Aniss Chad
*Assistant Examiner* — Chase L Cooley
(74) *Attorney, Agent, or Firm* — Dinsmore & Shohl LLP (57) ABSTRACT

A vehicle control device controls a driving device in such a manner that driving torque coincides with normal torque. The vehicle control device starts a traction control for controlling the driving device in such a manner that the driving torque coincides with suppressed torque which is smaller than the normal torque, when a predetermined traction control start condition is satisfied. The vehicle control device determines that the driver is in a non-grasp state, when an operation amount has changed to satisfy a condition in an initial determination time period. The vehicle control device starts, at an acceleration time point, an operation priority control for controlling the driving device in such a manner that the driving torque coincides with acceleration priority torque which is larger than the suppressed torque and smaller than the normal torque, if the control device had not determined that the driver was in the non-grasp state.

5 Claims, 6 Drawing Sheets

(56) References Cited

U.S. PATENT DOCUMENTS

2015/0251658 A1*  9/2015  Kato .................. B60L 3/102
                                                      701/22
2018/0134156 A1   5/2018  Nonaka et al.

FOREIGN PATENT DOCUMENTS

| JP | 2009-248633 A | 10/2009 |
| JP | 2016-215902 A | 12/2016 |

* cited by examiner

VEHICLE CONTROL DEVICE

CROSS-REFERENCE TO RELATED APPLICATIONS

This application claims the benefit of priority to Japanese Patent Application No. 2018-220126 filed Nov. 26, 2018, which is incorporated by reference herein in its entirety including the specification, drawings and abstract.

BACKGROUND

Technical Field

The present disclosure relates to a vehicle control device for executing a traction control when a slip degree of driving wheels has satisfied a predetermined degree condition.

RELATED ART

Hitherto, there have been known vehicle control devices configured to execute the traction control for controlling driving force applied to the driving wheel in such a manner that a slip degree of driving wheels coincides with a target slip degree, when at least one of the driving wheels slips. One of such vehicle control devices (hereinafter, referred to as "a conventional device"), which is disclosed in Japanese Patent Application Laid-open No. 2016-215902, changes the target slip degree based on at least one of a vehicle body speed, a wheel speed difference representing the slip degree, and an acceleration opening degree (a driving requirement amount).

More specifically, the conventional device changes the target slip degrees from a normal value to a value larger than the normal value, when the acceleration opening degree is large.

The conventional device changes the target slip degrees from the normal value to the value larger than the normal value, when the vehicle body speed is high. The conventional device changes the target slip degrees from the normal value to the value larger than the normal value, when the wheel speed difference is small.

SUMMARY

A driver may perform an acceleration operation to increase an operation amount of an acceleration pedal (an accelerator) at a time point at which the driver grasps (or realizes, understands) that a vehicle is about to enter or has entered from a slippery road surface (a low p road) to a non-slippery road surface (a high p road) in a time period in which the traction control is being executed. If the vehicle does not accelerate when the driver performs the acceleration operation, the driver may feel uncomfortable/uneasy with a movement/behavior of the vehicle.

Meanwhile, the driver may perform the acceleration operation without grasping a road surface (condition/state of a road surface) even though the vehicle is traveling on the low p road. When the vehicle accelerates in response to the acceleration operation under the situation described above, the driving wheel slips more severely, so that the slip degree increases. As a result, the vehicle falls into a state in which the vehicle cannot accelerate.

Therefore, the following vehicle control device is desirable. That is, the vehicle control device immediately and correctly determines whether or not the driver grasps the condition of the road surface when the driver performs the acceleration operation. The vehicle control device applies the driving force corresponding to the acceleration operation to the driving wheels in order to accelerate the vehicle, when it has determined that the driver grasps the condition of the road surface.

The conventional device changes the target slip degree in such a manner that the target slip degree becomes larger at a time point at which "a state in which the wheel speed difference is small" continues for a predetermined time from "a time point at which the acceleration opening degree becomes large in a state in which the vehicle body speed is high". It should be noted that an allowable/permissible slip degree of the driving wheel becomes larger, as the target slip degree becomes larger. Therefore, the driving force applied to the driving wheels can increase in accordance with the operation of the accelerator. In the conventional device, even if the driver performs the acceleration operation with grasping the condition of the road surface, the acceleration of the vehicle is delayed by the predetermined time from a time point at which the driver performs the acceleration operation.

The present disclosure has been made to solve the problem described above. The present disclosure has an object to provide a vehicle control device capable of immediately and correctly determining whether or not the driver grasps the condition of the road surface at the time point of the acceleration operation, and capable of accelerating the vehicle when it is determined that the driver grasps the condition of the road surface.

A vehicle control device (hereinafter, may be referred to as "the present control device") according to one embodiment of the present disclosure comprises an acceleration operation amount sensor (46) for measuring an operation amount (Acc) of an accelerator (44) varied by a driver, and a control device (52, 48, 42) for controlling a driving device (43) of a vehicle in such a manner that driving torque which the driving device applies to driving wheels of the vehicle coincides with normal torque which becomes larger as the operation amount becomes larger.

The control device is configured to: start a traction control for controlling the driving device (Step 450) in such a manner that the driving torque coincides with suppressed torque which is smaller than the normal torque and which becomes larger as the operation amount becomes larger (MapTR1(Acc)), when a slip index value representing a slip degree (SD) of the driving wheels satisfies a predetermined traction control start condition ("Yes" at Step 420);

determine that the driver is in a non-grasp state in which the driver does not grasp a condition of a road surface (Step 535), when the operation amount has changed to satisfy a predetermined specific condition in an initial determination time period (Thantei) from a start time point at which the traction control is started to a time point at which a predetermined time period elapses from the start time point, the predetermined specific condition being a condition which the operation amount is not considered to satisfy when the driver has been grasping the condition of the road surface ("Yes" at Step 520); and start, during a time period in which the traction control is being executed, an operation priority control (Step 470) at an acceleration operation time point at which the operation amount becomes equal to or larger than a threshold operation amount after the initial determination time period ("Yes" at Step 445), if the control device had not determined in the initial determination time period that the driver was in the non-grasp state ("No" at Step 460), the operation priority control being a control for controlling the driving device in such a manner that the driving torque coincides with acceleration priority torque (MapTr2(Acc)) which is larger than the suppressed torque and equal to or smaller than the normal torque and which becomes larger as the operation amount becomes larger.

When the operation amount of the accelerator satisfies the specific condition in the initial determination time period, the present control device determines that the driver is in the non-grasp state in which the driver does not grasp the condition of the road surface. When it has not been determined that the driver is in the non-grasp state before the acceleration operation time point at which the operation amount of the accelerator becomes equal to or larger than the threshold operation amount, the present control device presumes that the driver has not been in the non-grasp state to execute the operation priority control. In this manner, the present control device can immediately and correctly determine whether or not the driver grasps the condition of the road surface, and immediately have/let the acceleration of the vehicle reflect an acceleration intention of the driver.

In one embodiment of the present disclosure, the control device is configured to determine, in the initial determination time period, that the operation amount satisfies the predetermined specific condition (Step 535) when the operation amount becomes equal to or larger than a first threshold acquired by adding a first predetermined amount (D1th) to a start operation amount (Acc1) which is the operation amount at the start time point ("Yes" at Step 520) in the initial determination time period.

When the operation amount becomes equal to or larger than the first threshold during the initial determination time period (the first threshold being acquired by adding "the first predetermined amount" to "the operation amount (the start operation amount) measured at the start time point of the traction control"), the driver operates the accelerator in such a manner that increase in the operation amount from the start time point becomes larger than the first predetermined amount. Meanwhile, at the start time point of the traction control, at least one of the drive wheels is slipping. Accordingly, when the driver operates the accelerator in such a manner that the operation amount becomes larger from the start operation amount while the traction control is being executed, it is considered that the driver does not grasp that at least one of the driving wheels is slipping, that is, the driver does not grasp the condition of the road surface. Accordingly, the embodiment of the present control device can determine that the driver is in the non-grasp state more accurately.

In one embodiment of the present disclosure, the control device is configured to determine that the driver is not in the non-grasp state (Step 525), when the operation amount becomes smaller than a second threshold acquired by subtracting a second predetermined amount (D2th) from a maximum value (MAXAcc) of the operation amount obtained in a period from the start time point during the initial determination time period ("Yes" at Step 530), even after the operation amount has once become equal to or larger than the first threshold once so as to satisfy the predetermined specific condition ("Yes" at Step 520).

After the driver once operates the accelerator to increase the operation amount from the start operation amount even when at least one of the drive wheels is slipping, the driver may start to grasp the condition of the road surface thereafter. In this case, the driver operates the acceleration operator so as to decrease the operation amount. According to the above embodiment, when the operation amount becomes smaller than the second threshold value which is smaller than "the maximum value of the operation amount in a period from the start time point" by the second predetermined amount, it is determined that the driver is grasping the condition of the road surface. Therefore, the embodiment can determine that the driver starts to grasp the condition of the road surface after it was once determined that the driver did not grasp the condition of the road surface. Accordingly, the embodiment can more accurately determine whether or not the driver grasps the condition of the road surface.

In one embodiment of the present disclosure, the control device is configured to determine whether or not the road surface is a low μ road based on the slip index value (Step 620), and not to start the operation priority control at the acceleration operation time point (Step 450), if the control device has determined that the road surface is the low μ road before the acceleration operation time point, even if the control device has not determined that the driver is in the non-grasp state ("Yes" at Step 465).

Even if it has not been determined that the driver was in the non-grasp state before the acceleration operation time point, the operation priority control is not started at the acceleration operation time point when it has been determined that the road surface is the low μ road before the acceleration operation time point. Accordingly, the embodiment can reduce the possibility that the operation priority control is executed while the vehicle is traveling on the low μ road.

In one embodiment of the present disclosure, the control device is configured to determine that the road surface is not the low μ road (Step 615) when the slip index value is equal to or smaller than a predetermined high μ road determination threshold at the acceleration operation time point ("Yes" at Step 610).

When the slip index value is equal to or smaller than the high μ road determination threshold at the acceleration operation time point, the embodiment determines that the road surface is not the low μ road. Therefore, the embodiment can more accurately determine that the road surface is not the low μ road.

In one embodiment of the present disclosure, the control device is configured to determine that the road surface is the low μ road (Step 625) when the slip index value becomes equal to or larger than a predetermined low μ road determination threshold at and after the start time point ("Yes" at Step 620).

When the slip index value becomes equal to or larger than the predetermined low μ road determination threshold at and after the start time point, the embodiment determines that the road surface is the low μ road. Therefore, the embodiment can more accurately determine that the road surface is the low μ road.

In one embodiment of the present disclosure, the control device is configured to stop the operation priority control ("Yes" at Step 460, "Yes" at Step 465) and start an enhanced traction control for controlling the driving device in such a manner that the driving torque coincides with strongly suppressed torque (MapTr3(Acc)) which is smaller than the suppressed torque and which becomes larger as the operation amount becomes larger (Step 715), when the slip index value becomes equal to or larger than a stop slip threshold value while the operation priority control is being executed ("Yes" at Step 540, Step 535, "Yes" at Step 620, Step 625).

When the slip index value becomes equal to or larger than the stop slip threshold value after the operation priority control is once executed, there is a high possibility that the driver has mistakenly grasped that the vehicle has entered the high μ road despite that the vehicle is actually traveling on the low μ road. In this case, since the operation priority control is applying the large driving force to the driving wheels, the driving force should be decreased immediately. For this reason, the embodiment executes the strong traction control to immediately decrease the driving force.

In the above description, in order to facilitate the understanding of the disclosure, reference symbols used in embodiment of the present disclosure are enclosed in parentheses and are assigned to each of the constituent features of the disclosure corresponding to the embodiment. However, each of the constituent features of the disclosure is not limited to the embodiment as defined by the reference symbols. Other objects, other features, and accompanying advantages of the present disclosure can be readily understood from a description of the embodiments of the present disclosure provided referring to the accompanying drawings.

DETAIL DESCRIPTION (Configuration)

Figure 1:
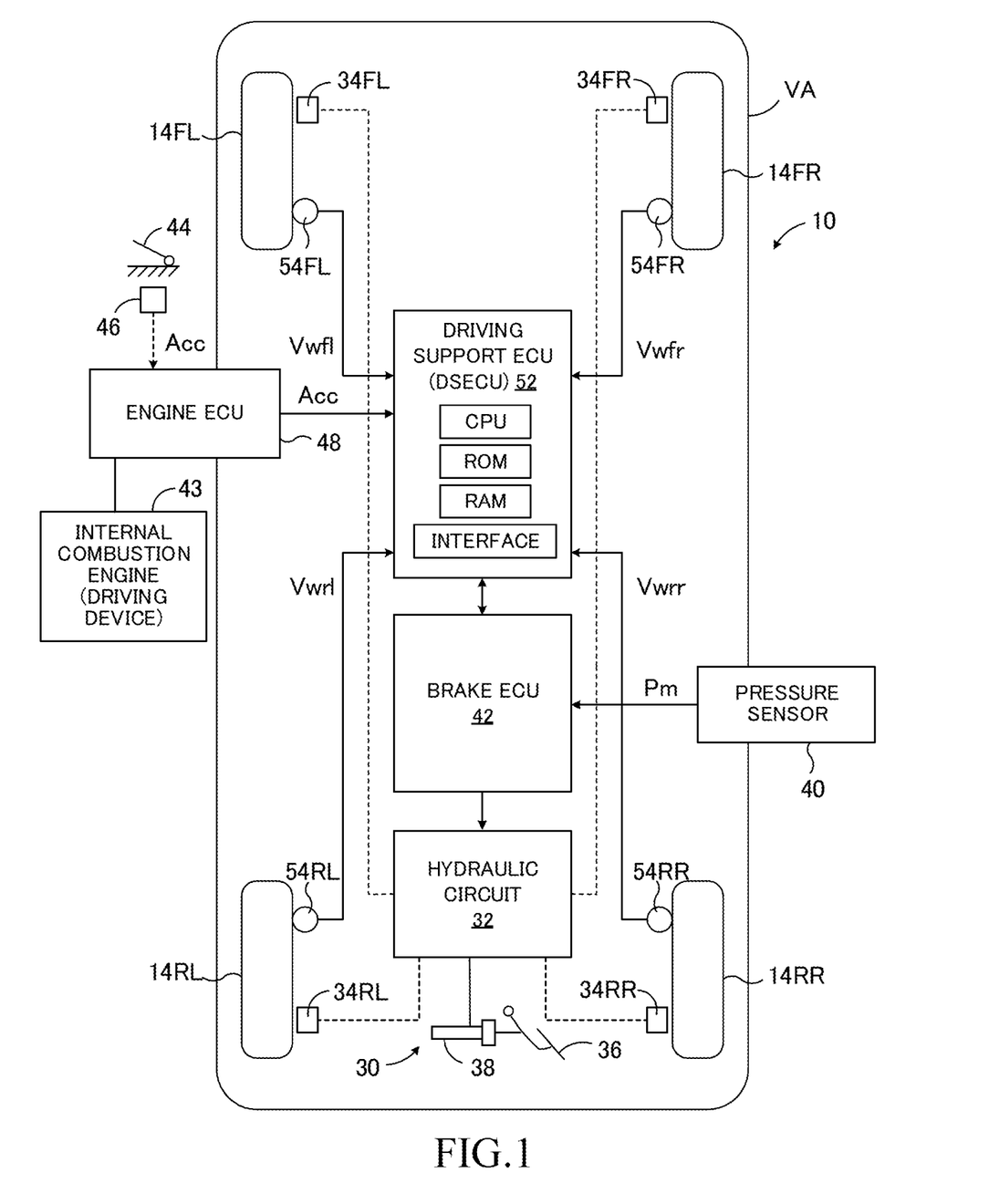
FIG. 1 is a schematic configuration diagram of a vehicle control device according to a first embodiment of the present disclosure.

A vehicle control device (hereinafter, referred to as "the present control device") 10 according to the present embodiment is installed in a vehicle VA shown in FIG. 1. The vehicle VA has wheels 14FL, 14FR, 14RL, and 14RR.

The vehicle VA has a brake device 30 for applying brake force to the wheels 14FL through 14RR. The brake device 30 has a hydraulic circuit 32, wheel cylinders 34FR, 34FL, 34RR, and 34RL provided in the wheels 14FR, 14FL, 14RR, and 14RL respectively, and a master cylinder 38 for pressurizing working oil in response to a depressing operation on/to a brake pedal 36 by a driver. Although not shown in detail in FIG. 1, the hydraulic circuit 32, which functions as a brake actuator, has a reservoir, an oil pump, various valve devices, or the like.

The brake device 30 applies the brake force in proportion to pressure in the wheel cylinders 34FL though 34RR to the wheels 14FL though 14RR, respectively. Normally, the pressure in the wheel cylinders 34FL through 34RR is controlled based on pressure (master cylinder pressure Pm) in the master cylinder 38 which is driven in response to the depressing operation on/to the brake pedal 36. That is, a brake ECU (Electronic Control Unit) 42 controls the pressure in the wheel cylinders 34FL through 34RR based on the master cylinder pressure Pm measured by a pressure sensor 40. Furthermore, when necessary, the brake ECU 42 controls the oil pump and the various valve devices to control the pressure in the wheel cylinders 34FL through 34RR regardless of a depressing amount of the brake pedal 36.

Although not shown in FIG. 1, the vehicle VA has an internal combustion engine (hereinafter, simply referred to as "an engine") 43, which functions as a driving device (a driving source), for applying driving force to driving wheels among the wheels 14FL through 14RR. An acceleration opening degree sensor 46 measures a depressing amount (hereinafter, may be referred to as "an acceleration operation amount") of an acceleration pedal 44 by the driver as an acceleration opening degree Acc. The acceleration opening degree Acc measured by the acceleration opening degree sensor 46 becomes "0" when the driver does not depress the acceleration pedal 44 (in other words, when the acceleration pedal 44 is at an initial position). The acceleration opening degree Acc measured by the acceleration opening degree sensor 46 becomes larger as the depressing amount of the acceleration pedal 44 becomes larger.

Normally, an engine ECU 48 controls output torque of the engine based on the acceleration opening degree Acc. More specifically, the output torque of the engine becomes larger as the acceleration opening degree becomes larger. It should be noted that the driving device may be any device for applying the driving force to the driving wheels. For example, the driving device may be an electric motor, a hybrid system, or the like. In the present example, the driving wheels are rear wheels 14RL and 14RR.

The vehicle VA has wheel speed sensors 54FL, 54FR, 54RL, and 54RR. The wheel speed sensors 54FL, 54FR, 54RL, and 54RR measure a wheel speed Vwi (I=fl, fr, rl, or rr) of the wheels 14FL through 14RR, respectively. Each of the wheel speed sensors 54FL, 54FR, 54RL, and 54RR transmit a signal representing the wheel speed Vwi to a driving support ECU (hereinafter, referred to as "a DSECU"). Hereinafter, when the wheel speed sensors 54FL, 54FR, 54RL, and 54RR do not need to be distinguished from each other, they are referred to as "wheel speed sensors 54".

Each of the brake ECU 42, the engine ECU 48, and the DSECU 52 includes a microcomputer having a CPU, a ROM, a RAM, and an interface, which are connected to each other via a bidirectional common bus. The CPU achieves various functions described later through executing control programs (instruction, routines) stored in a memory (the ROM). The control programs are stored in the ROM. The ECUs 42, 48 and 52 transmit/receive necessary signals to/from each other. It should be noted that some or all of those ECUs may be integrated into a single ECU.

(Outline of Operation)

The DSECU 52 determines that at least one of the driving wheels slips to execute (start) a traction control described later, when a slip degree (a slip index value) SD representing (indicative of) a degree of slipping of at least one of the driving wheels satisfies a predetermined start condition (a traction control start condition). The DSECU 52 ends the traction control when the slip degree SD satisfies a predetermined end condition.

First, a calculation process of the slip degree SD is described.

The DSECU 10 calculates the slip degree SD of the driving wheels based on the wheel speeds Vwi represented by the signals transmitted from each of the wheel speed sensors 54, every time a predetermined time period elapses.

More specifically, the DSECU 52 calculates the slip degree SD according to the following equation (1).

$$SD = Vd\,\text{Max} - Vr\,\text{Min} \quad (1)$$

"VdMax" in the above equation (1), which is referred to as "a driving wheels maximum speed VdMax", represents the wheel speed Vwrl of the driving wheel 14RL or the wheel speed Vwrr of the driving wheel 14RR, whichever is higher. Meanwhile, "VrMin" in the above equation (1), which is referred to as "a driven wheels minimum speed VrMin", represents the wheel speed Vwfl of the driven wheel 14FL or the wheel speed Vwfr of the driving wheel 14FR, whichever is lower.

Figure 2:
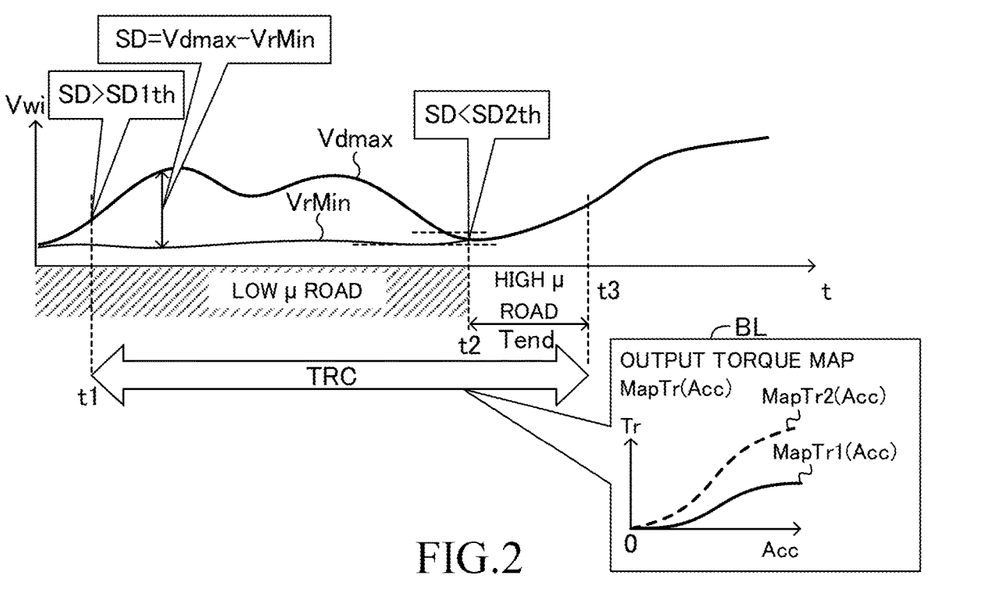
FIG. 2 is a time chart illustrating a change in a driving wheels maximum speed and a driven wheels minimum speed.

When the slip degree SD becomes larger than a first threshold degree SD1th, the DSECU 52 determines that the start condition becomes satisfied to start the traction control. In an example shown in FIG. 2, the slip degree SD becomes larger than the first threshold degree SD1th at a time point t1. Therefore, the DSECU 52 determines that the start condition becomes satisfied to start the traction control (a normal TRC control described later) at the time point t1.

When a state in which the slip degree SD is smaller than a second threshold degree SD2th continues for a predetermined time period Tend while no brake force is being applied to the driving wheels 14RL and 14RR, the DSECU 52 determines that the end condition is/becomes satisfied to end the traction control. The second threshold degree SD2th has been set to a value smaller than the first threshold degree SD1th. In the example shown in FIG. 2, the slip degree SD changes from a value larger than the second threshold degree SD2th to a value smaller than the second threshold degree SD2th at a time point t2. The state in which the slip degree SD is smaller than the second threshold degree SD2th continues for a time period from the time point t2 to a time point at which the predetermined time period Tend elapses from the time point t2. Therefore, the DSECU 52 determines that the end condition becomes satisfied at the time point t3 to end the traction control.

When the driver further (or more deeply) depresses the acceleration pedal 44 from a position of the acceleration pedal 44 at a start time point at which the traction control starts in an initial determination time period Thantei (referring to FIG. 3) from the start time point to a time point at which a predetermined time (Thantei) elapses from the start time point, the DSECU 52 determines that the driver is in a non-grasp state in which the driver does not grasp the condition of the road surface. More specifically, when the following equation (2) is satisfied in the initial determination time period Thantei, the DSECU 52 determines that the driver is in the non-grasp state.

$$Acct - Acc1 \geq D1th \quad (2)$$

"Acct" in the above equation (2), which may be referred to as "the present acceleration opening degree Acct", represents the acceleration opening degree Acc at the present time point. "Acc1" in the above equation (2), which may be referred to as "a start acceleration opening degree Acc1" or "a start operation amount", represents the acceleration opening degree Acc at the start time point of the traction control. "D1th" in the above equation (2), which may be referred to as "a first threshold D1th", represents a predetermined threshold.

When the operation amount of the acceleration pedal 44 becomes equal to or larger than a first threshold which is larger than the start operation amount Acc1 by the first predetermined amount D1th, the above equation (2) becomes/is satisfied.

When the DSECU 52 determines that the driver is in the non-grasp state, the DSECU 52 sets a value of an grasp flag Xund to "0". When the traction control ends, the value of the grasp flag Xund is set to "1". Therefore, the value of the grasp flag Xund is "1" at a time point at which the traction control starts anew.

When the driver greatly/largely returns the acceleration pedal in the initial determination time period Thantei, even after the above equation (2) was once satisfied so that the DSECU 10 determined that the driver was in the non-grasp state, the DSECU 52 determines that the driver is not in the non-grasp state, in other words, the DSECU 52 determines that the driver is in a grasp state in which the driver grasps the condition of the road surface. More specifically, even if the above equation (2) was once satisfied in the initial determination time period Thantei, the DSECU 52 determines that the driver is in the grasp state to set the value of the grasp flag Xund to "1" when the following equation (3) is satisfied.

$$\text{MAXAcc} - Acct > D2th \quad (3)$$

"MAXAcc" in the above equation (3), which is referred to as "a maximum acceleration opening degree MAXAcc", represents the maximum value of the acceleration operation degree Acc in a time period from the start time point of the traction control to the present time point. "D2th" in the above equation (3), which is referred to as "a second predetermined amount", represents a threshold D2th larger than the first threshold D1th.

When the operation amount of the acceleration pedal 44 becomes smaller than a second threshold which is smaller than the maximum acceleration opening degree MAXAcc by the second predetermined amount D2th, the above equation (3) becomes/is satisfied.

When the driver operates the acceleration pedal 44 in such a manner that the present acceleration opening degree Acct becomes equal to or larger than a threshold opening degree Accth after the initial determination time period Thantei, the DSECU 52 checks/determines whether or not the driver was determined to be in the non-grasp state in the initial determination time period Thantei.

When the driver was not determined to be in the non-grasp state in the initial determination time period Thantei, in other words, when it was determined that the driver was in the grasp state in the initial determination time period Thantei, it is highly likely that the driver has performed "the acceleration operation which has made the present acceleration opening degree Acct equal to or larger than the threshold opening degree Accth" with grasping the condition of the road surface. More specifically, there is a high probability that the driver has performed the above acceleration operation with grasping that the vehicle has entered a non-slippery road surface (a high μ road) from a slippery road surface (a low μ road). The high μ road represents a road having a high road surface friction coefficient. The low μ road represents a road having a low road surface friction coefficient. In this case, the DSECU 52 executes an "operation priority traction control (TRC)" described below.

On the other hand, when the driver was determined to be in the non-grasp state in the initial determination time period Thantei, there is a high probability that the driver has performed the acceleration operation which has made the present acceleration opening degree Acct equal to or larger than the threshold opening degree Accth without grasping the condition of the road surface. In this case, the DSECU 52 continues the normal traction control (the normal TRC) which has been executed until the present time point.

Here, a difference between the normal TRC and the operation priority TRC will be described.

<Normal TRC>

In the normal TRC, the DSECU 52 acquires target output torque Trtgt by applying the present acceleration opening degree Acct to a first output torque map MapTr1(Acc) (referring to a block BL shown in FIG. 2) to transmit the target output torque Trtgt to engine ECU 48 as a TRC output instruction. When the engine ECU 48 receives the TRC output instruction, the engine ECU 48 controls a throttle value (not shown) in such a manner that the actual output torque coincides with the target output torque Trtgt.

The first output torque map MapTr1(Acc) defines a relationship between the target output torque Trtgt and the acceleration opening degree Acc in such a manner that the target output torque Trtgt, which has been to set to a value smaller than a normal target output torque Trtgt used in a normal state in which the traction control is not executed, becomes larger as the acceleration opening degree Acc becomes larger. The target output torque Trtgt defined by the first output torque map MapTr1(Acc) may be referred to as "a suppressed torque (or control torque)". In the present embodiment, the first output target torque map MapTR1(Acc) defines the target output torque Trtgt in such a manner that the target output torque Trtgt is 30% of the normal target torque Trtgt.

In the normal TRC, when the slip degree SD has been larger than a target slip degree SDtgt, the DSECU 52 transmits "a TRC brake instruction to apply predetermined brake force to the driving wheels 14RL and 14RR" to the brake ECU 42. The brake ECU 42 controls the pressure of the wheel cylinders 34RL and 34RR to apply the predetermined brake force to the driving wheels 14RL and 14RR in response to the TRC brake instruction.

As described above, in the normal TRC, the output torque output by the engine becomes smaller than the output torque output by the engine in the normal state, and, if required, the predetermined brake force is applied to the driving wheels 14RL and 14RR. Therefore, driving force Dv of the driving wheels 14RL and 14RR is controlled in such a manner that the slip degree SD coincides with (comes closer to) the target slip degree SDtgt.

<Operation Priority TRC>

In the operation priority TRC, the DSECU 52 acquires the target output torque Trtgt by applying the present acceleration opening degree Acct to a second output torque map MapTr2(Acc) (referring to the block BL shown in FIG. 2) to transmit the target output torque Trtgt to the engine ECU 48 as the TRC output instruction.

The second output torque map MapTr2(Acc) defines a relationship between the target output torque Trtgt and the acceleration opening degree Acc in such a manner that the target output torque Trtgt, which is larger than the target output torque Trtgt defined by the first output torque map MapTr1(Acc), becomes larger as the acceleration opening degree Acc becomes larger. In the present embodiment, the second output target torque map MapTR2(Acc) defines the target output torque Trtgt in such a manner that the target output torque Trtgt is the same as the normal target torque Trtgt. The target output torque Trtgt defined by the second output torque map MapTr2(Acc) may be referred to as "an acceleration priority torque".

In the operation priority TRC, even when the slip degree SD has been larger than the target slip degree SDtgt, the DSECU 52 applies no brake force to the driving wheels 14RL and 14RR.

As described above, the operation priority TRC can make an acceleration of the vehicle VA reflect an acceleration intention of the driver through depressing the acceleration pedal 44, as compared with the normal TRC. The DSECU 52 presumes/determines that the driver has still being grasping the condition of the road surface to start executing the above-described operation priority TRC at a time point at which the present acceleration operation degree Acct becomes equal to or larger than the threshold opening degree Accth after the initial determination time period Thantei, in the case where it was not determined that the driver was in the non-grasp state during the initial determination time period Thantei. Therefore, the DSECU 52 can immediately and correctly determine whether or not the driver depresses the acceleration pedal 44 with grasping the condition of the road surface, and immediately make the acceleration of the vehicle VA reflect the acceleration intention of the driver.

(The Other Operations)

At an acceleration operation time point at which the present acceleration opening degree Acct becomes equal to or larger than the threshold opening degree Accth, the DSECU 52 determines whether or not the slip degree SD is equal to or smaller than a third threshold degree SD3th in order to more accurately determine whether or not the driver has been grasping the condition of the road surface. The third threshold degree SD3th may be referred to as "a high μ road determination threshold". When the slip degree SD becomes equal to or smaller than the third threshold degree SD3th at the acceleration operation time point, it can be regarded that the driver had grasped the condition of the road surface in the initial determination time period Thantei and the driver has been grasping the condition of the road surface at the acceleration operation time point.

When the slip degree SD is equal to or smaller than the third threshold degree SD3th at the acceleration operation time point, the DSECU 52 sets a value of a road surface flag Xrmn to "1". The road surface flag Xrmn represents that the vehicle VA is traveling on the high μ road if its value of the flag Xrmn is "1", and represents that the vehicle VA is traveling on the low μ road if its value of the flag Xrmn is "0". The value of the road surface flag Xrmn is set to "1", when the traction control ends. Therefore, the value of the road surface flag Xrmn is "1" at a time point at which the traction control starts anew.

It should be noted that the third threshold degree SD3th has been set to a value larger than the second threshold degree SD2th. The third threshold degree SD3th may be larger or smaller than the first threshold degree SD1th as long as the third threshold degree SD3th is larger than the second threshold degree SD2th. As the threshold degree SD3th is smaller, the slip degree SD must be smaller in order to satisfy the above determination condition, and thus, it is more unlikely for the slip degree SD to satisfy the above determination condition. That is, the smaller third threshold degree SD3th can decrease a possibility that the DSECU 52 mistakenly determines that the vehicle VA is traveling on the high μ road even when the vehicle VA is traveling on the low μ road. In the meanwhile, the smaller third threshold degree SD3th can also decrease a possibility that the acceleration intention of the driver is immediately reflected in the acceleration of the vehicle VA can be decreased. The third threshold degree SD3th may have been set to an appropriate value larger than the second threshold degree SD2th.

When both of the value of the grasp flag Xund and the value of the road surface flag Xrmn have been set to "1" at the acceleration operation time point, the DSECU 52 executes the operation priority TRC.

The DSECU 52 determines whether or not the slip degree SD becomes equal to or larger than a fourth threshold degree SD4th which has been set to a value larger than the third threshold degree SD3th, while the DSECU 52 is executing the traction control. The fourth threshold degree SD4th may be referred to as "a low μ road determination threshold" or "a stop slip threshold". According to the present embodiment, the target output torque Trtgt calculated/used though each of the normal TRC and the operation priority TRC is a value reflecting (varying depending on) the acceleration opening degree Acc. Therefore, when the slip degree SD becomes equal to or larger than the fourth threshold degree SD4th, it is considered that the driver does not grasp the condition of the road surface and the vehicle is traveling on the low μ road. Accordingly, in this case, the DSECU 52 sets both the value of the road surface flag Xrmn and the value of the grasp flag Xund to "0". However, even if the slip degree SD becomes equal to or larger than the fourth threshold degree SD4th in the initial determination time period Thantei, the DSECU 52 does not set the value of the grasp flag Xund to "0".

Concrete Example

Figure 3:
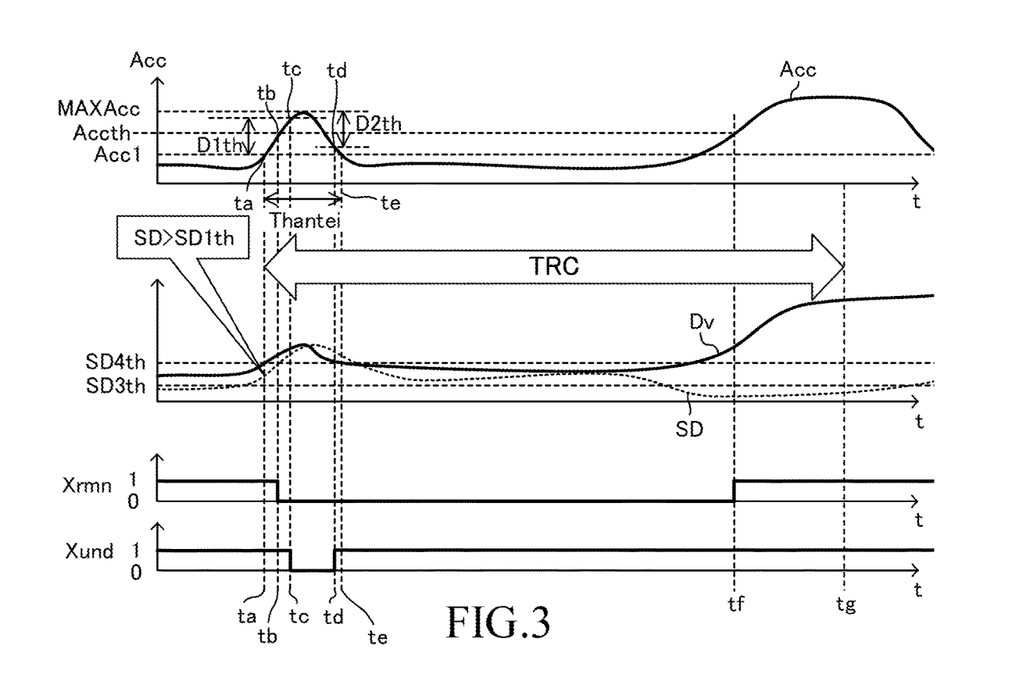
FIG. 3 is a time chart illustrating a change in an accelerator opening degree, a slip degree, driving force, a road surface flag, and a grasp flag.

In an example shown in FIG. 3, the slip degree SD becomes equal to or larger than the first threshold degree SD1th at a time point ta. At the time point ta, the DSECU 52 starts the traction control (the normal TRC) and stores the present acceleration opening degree Acct as the start acceleration opening degree Acc1. Both the value of the grasp flag Xund and the value of the road surface flag Xrmn have been set to "1" at the time point ta.

The DSECU 52 sets the value of the road surface flag Xrmn to "0" at a time point tb at which the slip degree SD become equal to or larger than the fourth degree SD4th. The time point tb is included in the initial determination time period Thantei. Therefore, the DSECU 52 does not set the value of the grasp flag Xund to "0", so that the value of the grasp flag Xund remains "1".

The above equation (2) is satisfied at a time point tc at which the present acceleration opening degree Acct becomes equal to or larger than "a value acquired by adding the first threshold D1th to the start acceleration opening degree Acc1". Furthermore, the present acceleration opening degree Acct is the maximum acceleration opening degree MAXAcc at the time point tc. Therefore, the above equation (3) is not satisfied at the time point tc. Accordingly, the DSECU 52 determines that the driver is in the non-grasp state to set the value of the grasp flag Xund to "0" at the time point tc.

The above equation (3) is satisfied at a time point td at which the present acceleration opening degree Acct becomes equal to or smaller than a value acquired by subtracting the second threshold D2th from the maximum acceleration opening degree MAXAcc. In this case, the DSECU 52 determines that the driver is in the grasp state to set the value of the grasp flag Xund to "1".

The initial determination time period Thantei ends at a time point te at which the predetermined time period elapses from the time point ta.

The DSECU 52 determines whether or not the slip degree SD becomes equal to or smaller than the third threshold degree SD3th at a time point tf at which the present acceleration opening degree Acct becomes equal to or larger than the threshold degree Accth. The slip degree SD is equal to or smaller than the third threshold degree SD3th at the time point tf. Accordingly, the DSECU 52 sets the value of the road face flag Xrmn to "1".

At the time point tf, the present acceleration opening degree Acct becomes equal to or larger than the threshold opening degree Accth, and both the value of the grasp flag Xund and the value of the road surface flag Xrmn are set to "1". Accordingly, the DSECU 52 starts the operation priority TRC from the time point tf. It should be noted that the DSECU 52 was executing the normal TRC in a time period from the time point ta to a time point immediately before the time point tf.

At time point tg, "a state in which no brake force is applied to the driving wheels 14RL and 14RR and the slip degree SD is equal to or smaller than the second threshold degree SD2th" continues for the predetermined time period Tend. Accordingly, the DSECU 52 ends the traction control and sets the value of the grasp flag Xund and the value of the road surface flag Xrmn to "1" at the time point tg.

As described above, when it has not been determined that the driver has been in the non-grasp state at the acceleration operation time point, the DSECU 52 starts the operation priority TRC from the acceleration operation time point. Hereby, the DSECU 52 can immediately and correctly determine whether or not the driver operates the acceleration operation 44 with grasping the condition of the road surface, and can immediately make the acceleration of the vehicle VA reflect (varies depending on) the acceleration intention of the driver.

(Specific Operation)

The CPU of the DSECU 52 (hereinafter, "CPU" means the CPU of the DSECU 52 unless otherwise specified) is configured to execute a routine (a traction control routine) represented by a flowchart shown in FIG. 4, every time a predetermined time elapses.

Figure 4:
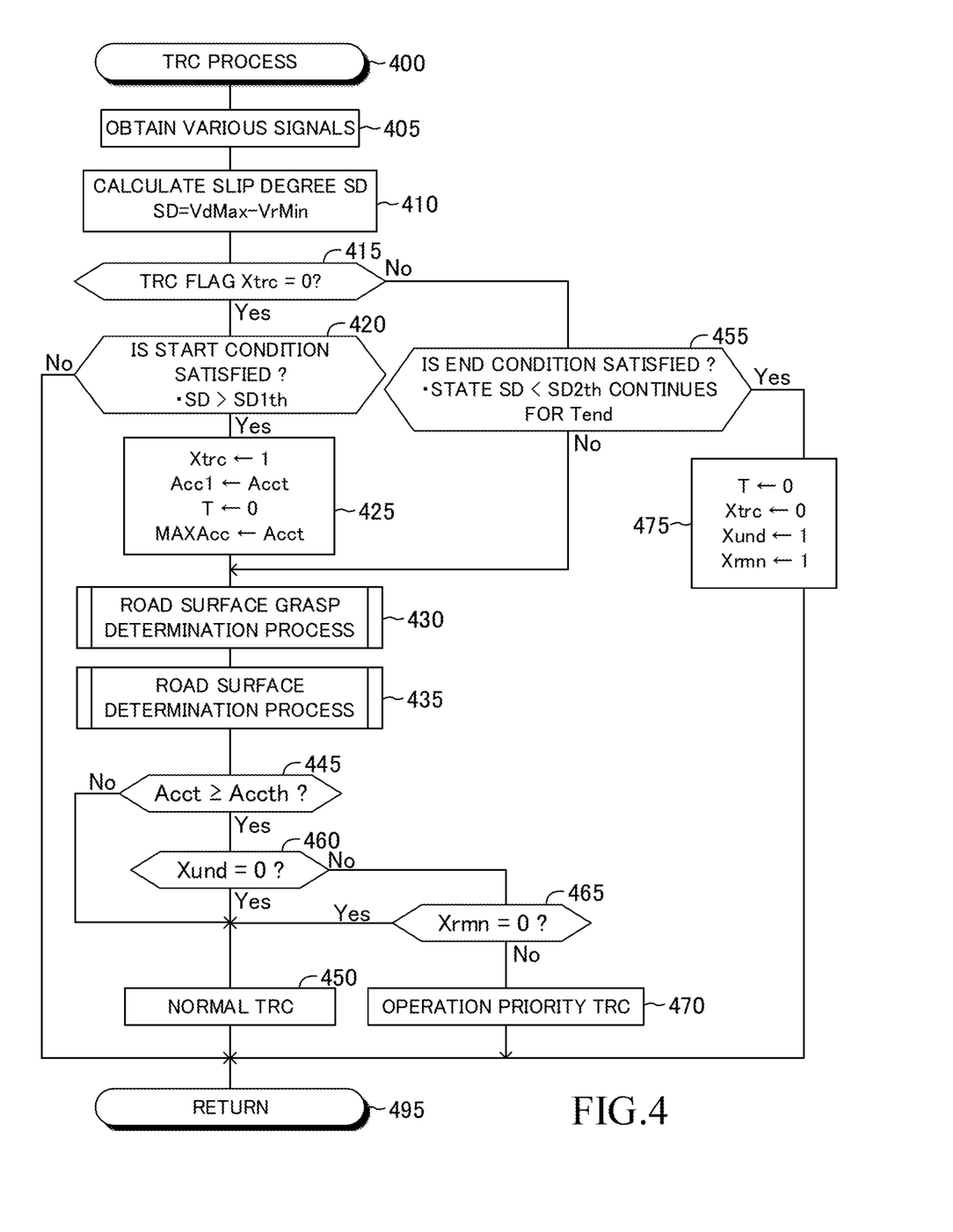
FIG. 4 is a flowchart illustrating a routine which CPU of a driving support ECU (DSECU) illustrated in FIG. 1 executes.

When a predetermined has come, the CPU starts processes from Step 400 shown in FIG. 4 to execute Steps 405 and 410 in that order, and proceeds to Step 415.

Step 405: The CPU reads out (obtains) information from various devices and various sensors which are connected to the DSECU 52.

Step 410: The CPU calculates the slip degree SD according to the above equation (1).

Step 415: The CPU determines whether or not a value of a TRC flag Xtrc is "0".

The value of the TRC flag Xtrc has been set to "1" while the traction control is being executed. The value of the TRC flag Xtrc has been set to "0" while the traction control is not being executed. The value of the TRC flag Xtrc is set to "0" through an initialization routine which the CPU executes when the driver performs an operation for changing a position of an ignition key switch (now shown) of the vehicle VA from an off-position to an on-position. Furthermore, the value of the grasp flag Xund and the value of the road surface flag Xrmn are set to "1" through the initialization routine.

When the value of the TRC flag Xtrc has been set to "0", that is, when the traction control is not executed, the CPU makes a "Yes" determination at Step 415 to proceed to Step 420.

The CPU determines whether or not the start condition of the traction control has been satisfied at Step 420. More specifically, the CPU determines whether or not the slip degree SD calculated at Step 410 has become larger than the first threshold degree SD1th.

When the slip degree SD is equal to or smaller than the first threshold degree SD1th (when the start condition of the traction control has not been satisfied), the CPU makes a "No" determination at Step 420, and proceeds to Step 495 to tentatively terminate the present routine. As a result, the traction control is not executed.

On the other hand, when the slip degree SD is larger than the first threshold degree SD1th (when the start condition of the traction control has been satisfied), the CPU makes a "Yes" determination at Step 420, and executes Steps 425 through 435 in that order, and proceeds to Step 445.

Step 425: The CPU sets the value of the TRC flag Xtrc to "1", because the traction control will start. Furthermore, the CPU stores the present acceleration opening degree Acct as the start acceleration opening degree Acc1. The CPU sets the value of "the timer T for counting a time period elapsed from a time point at which the CPU starts the traction control" to "0" to initialize the timer T. The CPU sets "the maximum acceleration opening degree MAXAcc indicative of the maximum value of the acceleration opening degree while the traction control is being executed" to "the present acceleration opening degree Acct".

Step 430: The CPU executes a condition of the road surface grasp determination process described later with reference to FIG. 5 to set the value of the grasp flag Xund to "0" or "1".

Step 435: The CPU executes a condition of the road surface determination process described later with reference to FIG. 6 to set the value of the road surface flag Xrmn to "0" or "1".

Step 445: The CPU determines whether or not the present acceleration opening degree Acct is equal to or larger than the threshold opening degree Accth.

When the present acceleration opening degree Acct is smaller than the threshold opening degree Accth, the CPU makes a "No" determination at Step 445 to proceed to Step 450.

The CPU executes the normal TRC described above at Step 450, and proceeds to Step 495 to tentatively terminate the present routine.

When the CPU proceeds to Step 415 in the present routine executed after the CPU sets the value of the TRC flag Xtrc to "1" at Step 425, the CPU makes a "No" determination at Step 415 to proceed to Step 455.

The CPU determines whether or not the end condition of the traction control has been satisfied at Step 455. That is, the CPU determines whether or not "the state in which no brake force is applied to the driving wheels 14RL and 14RR and the slip degree SD is smaller than the second threshold degree SD2th" has continued for the predetermined time Tend or longer.

When the end condition has not been satisfied, the CPU makes a "No" determination at Step 455, and executes Steps 430 and 435 to proceed to Step 445. When the present acceleration opening degree Acct is equal to or larger than the threshold opening degree Accth at a time point at which the CPU proceeds to Step 445, the CPU makes a "Yes" determination to proceed to Step 460.

The CPU determines whether or not the value of the grasp flag Xund has been set to "0" at Step 460. As described above, if the value of the grasp flag Xund is "0", grasp flag Xund represents that the driver is in the non-grasp state. Accordingly, if the value of the grasp flag Xund is "0", there is a high probability that the driver has operated the acceleration pedal 44 without grasping the condition of the road surface. In this case, the CPU makes a "Yes" determination at Step 460, and proceeds to Step 450 to execute the normal TRC.

In contrast, if the value of the grasp flag Xund is "1", the value of the grasp flag Xund represents that the driver is in the grasp state. In this case, the CPU makes a "No" determination at Step 460 to proceed to Step 465.

The CPU determines at Step 465 whether or not the value of the road surface flag Xrmn has been set to "0". When the value of the road surface flag Xrms has been set to "0", the vehicle VA is likely to be (has a high probability of) traveling on the low μ road. In this case, although the vehicle VA is traveling on the low μ road, the driver operates the acceleration pedal 44 so as to let/make the acceleration opening degree Acct become equal to or larger than the threshold opening degree Accth. In other words, even if the value of the grasp flag Xund has been set to "1", it is unlikely that the driver has been grasping the condition of the road surface. Accordingly, in this case, the CPU makes a "Yes" determination at Step 465, and proceeds to Step 450 to execute the normal TRC.

On the other hand, when the value of the road surface flag Xrmn has been set to "1", the vehicle VA is likely to be (has a high probability of) traveling on the high μ road. In this case, the CPU makes a "No" determination at Step 465 to proceed to Step 470.

The CPU executes the operation priority TRC described above at Step 470, and proceeds to Step 495 to tentatively terminate the present routine.

Meanwhile, when the end condition has been satisfied at a time point at which the CPU proceeds to Step 455, the CPU makes a "Yes" determination at Step 455 to proceed to Step 475. At Step 475, the CPU sets the value of the timer to "0", and sets the value of the TRC flag to "0". Furthermore, at Step 475, the CPU sets the value of the grasp flag Xund to "1", and sets the value of the road surface flag Xrmn to "1". Thereafter, the CPU proceeds to Step 495 to tentatively terminate the present routine.

<Road Grasp Determination Process (a Routine Shown in FIG. 5)>

Figure 5:
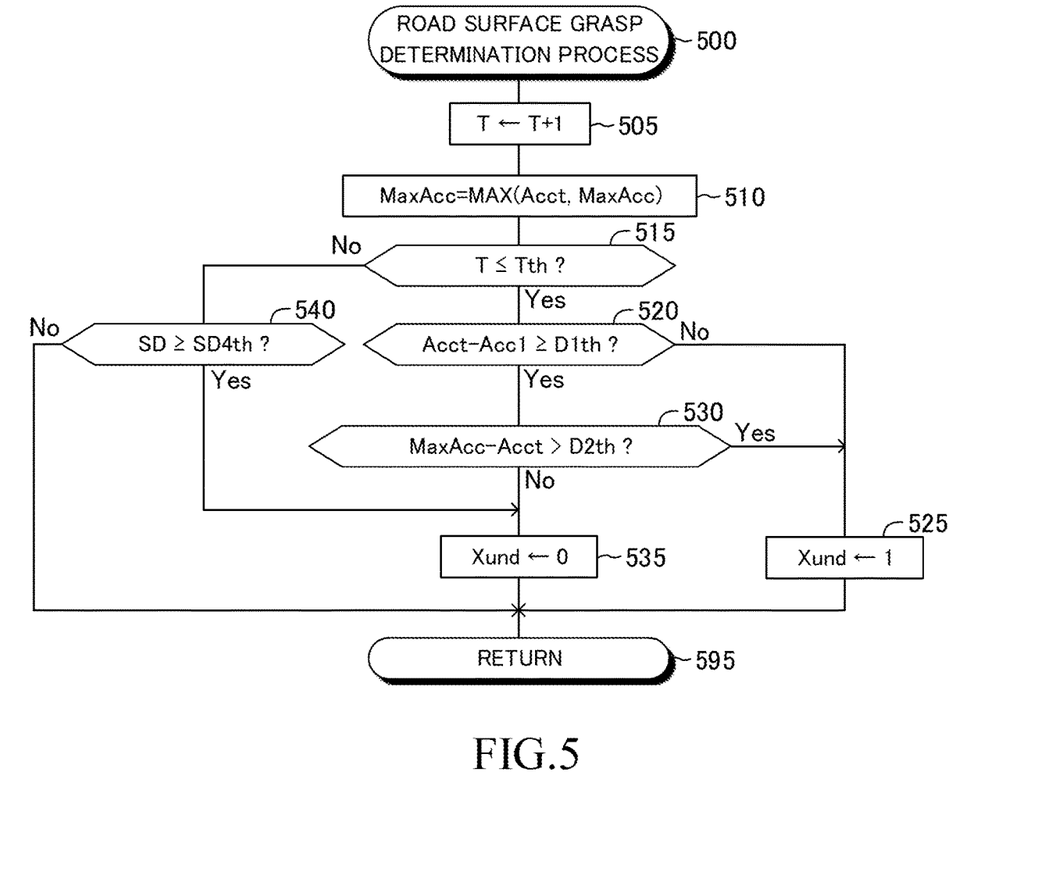
FIG. 5 is a flowchart illustrating a routine which the CPU executes in a process, which is illustrated in FIG. 4, for determining whether or not a driver grasps a road surface.

When the CPU proceeds to Step 430 shown in FIG. 4, the CPU starts processes of a subroutine represented by the flowchart shown in FIG. 5 from Step 500 to execute Steps 505 and 510 in that order. Thereafter, the CPU proceeds to Step 515.

Step 505: The CPU adds "1" to the timer T.

Step 510: When the present acceleration opening degree Acct becomes larger than the maximum acceleration opening degree MAXAcc, the CPU sets the maximum acceleration opening degree MAXAcc to the present acceleration opening degree Acct.

Step 515: The CPU determines whether or not the timer T is equal to or smaller than a threshold Tth corresponding to the initial determination time period Thanti.

When the timer T is equal to or smaller than the threshold Tth, the CPU makes a "Yes" determination at Step 515 to proceed to Step 520.

The CPU determines whether or not the equation (2) is satisfied at Step 520.

When the equation (2) is not satisfied, it is determined that the driver is in the grasp state, because the driver has not depressed the acceleration pedal 44 since the start time point of the traction control to the extent that it can be determined that the driver does not grasp that at least one of the driving wheels is slipping. In this case (when the equation (2) is not satisfied), the CPU makes a "No" determination at Step 520, and proceeds to Step 525 to set the value of the grasp flag Xund to "1". Thereafter, the CPU proceeds to Step 595 to tentatively terminate the present routine, and proceeds to Step 435 shown in FIG. 4.

On the other hand, when the equation (2) is satisfied at a time point at which the CPU proceeds to Step 520 shown in FIG. 5, the driver has depressed the acceleration pedal 44 to the extent that it can be determined that "the driver has not grasped that at least one of the driving wheels is slipping", and therefore, the CPU determines that there is a high probability that the driver is in the non-grasp state. In this case, the CPU makes a "Yes" determination at Step 520 to proceed to Step 530.

The CPU determines whether or not the equation (3) is satisfied at Step 530.

When the equation (3) is not satisfied, the driver has not released the acceleration pedal 44 to the extent that it can be determined that "the driver has grasped that at least one of the driving wheels is slipping", after the driver deeply/greatly depressed the acceleration pedal 44 once to the extent that it can be determined that "the driver has not grasped that at least one of the driving wheels is slipping". In this case, it can be finally determined that the driver is in the non-grasp state, and thus, the CPU makes a "No" determination at Step 530, and proceeds to Step 535 to set the value of the grasp flag Xund to "0". Thereafter, the CPU proceeds to Step 595 to tentatively terminate the present routine, and proceeds to Step 435 shown in FIG. 4.

On the other hand, when the equation (3) is satisfied at a time point at which the CPU proceeds to Step 530 shown in FIG. 5, the driver has released the acceleration pedal 44 to the extent that it can be determined "the driver has grasped that at least one of the driving wheels is slipping after the driver deeply/greatly depressed the acceleration pedal 44 once as described above. Therefore, in this case, it can be determined that the driver's state has changed from the non-grasp state to the grasp state at this time point. In this case, the CPU makes a "Yes" determination at Step 530, and proceeds to Step 525 to set the value of the grasp flag Xund to "1". Thereafter, the CPU proceeds to Step 595 to tentatively terminate the present routine.

When the timer T is larger than the threshold Tth at a time point at which the CPU proceeds to Step 515, the initial determination time period Thantei ends (or is over). In this case, the CPU makes a "No" determination at Step 515 to proceed to Step 540.

The CPU determines whether or not the slip degree SD is equal to or larger than the fourth threshold degree SD4th at Step 540.

When the slip degree SD is equal to larger than the fourth threshold degree SD4th, the slip degree SD becomes so large that it can no longer be determined that the driver has been grasping the condition of the road surface. Accordingly, in this case, the CPU determines that the driver is in the non-grasp state to make a "Yes" determination at Step 540, and proceeds to Step 535 to set the value of the grasp flag to "0".

On the other hand, when the slip degree SD is equal to or smaller than the fourth threshold degree SD4th at a time point at which the CPU proceeds to Step 540, the CPU makes a "No" determination at Step 540, and proceeds to Step 595 to tentatively terminate the present routine. Thereafter, the CPU proceeds to Step 435 shown in FIG. 4. As a result, the value of the road surface flag Xund remains the same as the previous value.

In this manner, even if the CPU once set the value of the grasp flag Xund to "1" to determine that the driver was in the grasp state before the end of the initial determination time period Thantei, the CPU sets the value of the grasp flag Xund to "0" to determine that the driver is in the non-grasped state when the slip degree SD becomes equal to or larger than the fourth degree SD4th after the end of the initial determination time period Thantei.

<A Condition of the Road Surface Determination Process (a Routine Shown in FIG. 6)>

Figure 6:
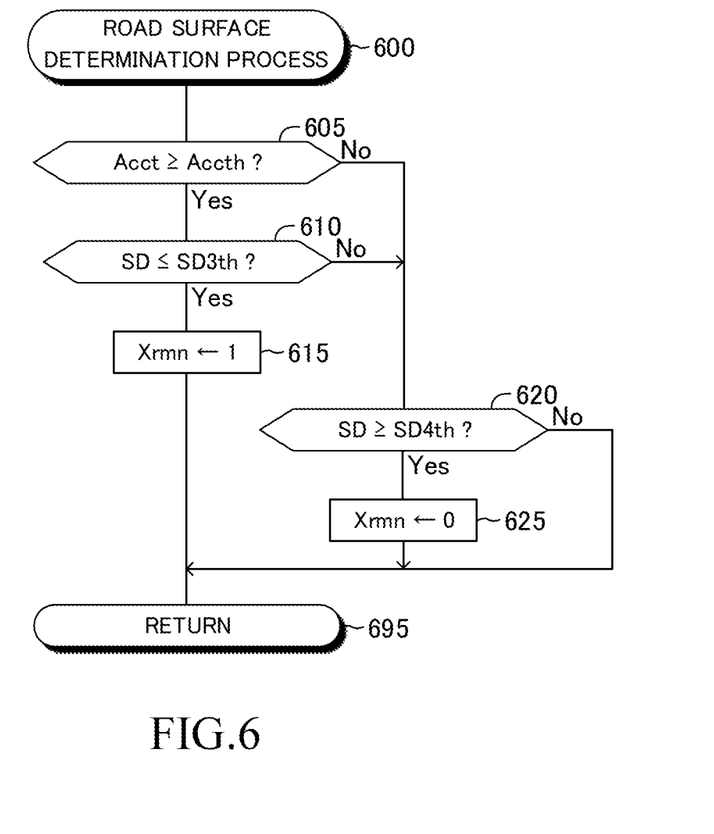
FIG. 6 is a flowchart illustrating a routine which the CPU executes in a process, which is illustrated in FIG. 4, for determining the road surface based on the slip degree.

When the CPU proceeds to Step 435 shown in FIG. 4, the CPU starts processes represented by a flowchart shown in FIG. 6 from Step 600, and proceeds to Step 605 to determine whether or not the present acceleration opening degree Acct is equal to or larger than the threshold opening degree Accth. When the present acceleration opening degree Acct is equal to or larger than the threshold opening degree Accth, the CPU makes a "Yes" determination at Step 605 to proceed to Step 610.

The CPU determines whether or not the slip degree SD is equal to or smaller than the third threshold degree SD3th at Step 610.

It can be determined that the vehicle VA is traveling on the high μ road, if the slip degree SD has been equal to or smaller than the third threshold degree SD3th despite that the present acceleration opening degree Acct has been equal to or larger than the threshold opening degree Accth (i.e., despite that the output torque of the engine has been equal to or larger than a predetermined value). Accordingly, in this case, the CPU makes a "Yes" determination at Step 610 to proceed to Step 615. The CPU sets the value of the road surface flag Xrmn to "1" at Step 615. Thereafter, the CPU proceeds to Step 695 to tentatively terminate the present routine, and proceeds to Step 445 shown in FIG. 4.

On the other hand, when the slip degree SD is larger than the third threshold degree SD3th, the CPU makes a "No" determination at Step 610, and proceeds to Step 620 to determine whether or not the slip degree SD is equal to or larger than the fourth threshold degree SD4th.

When the slip degree SD has been smaller than the fourth threshold degree SD4th, it is not reasonable for the CPU to determine that the vehicle VA is traveling on the low μ road. Accordingly, in this case, the CPU makes a "No" determination at Step 620, and proceeds to Step 695 to tentatively terminate the present routine. Thereafter, the CPU proceeds to Step 445 shown in FIG. 4. As a result, the value of the road surface flag Xrmn remains the same as the previous value.

When the slip degree SD has been equal to or larger than the fourth threshold SD4th at a time point at which the CPU proceeds to Step 620 shown in FIG. 6, it is reasonable for the CPU to determine that the vehicle VA is traveling on the low μ road. The CPU sets the value of the road surface flag Xrmn to "0" at Step 625, and proceeds to Step 695 to tentatively terminate the present routine. Thereafter, the CPU proceeds to Step 445 shown in FIG. 4.

On the other hand, when the present acceleration opening degree Acct has been smaller than the threshold opening degree Accth at a time point at which the CPU proceeds to Step 605, the CPU makes a "No" determination at Step 605, and proceeds to Step 620 to determine whether or not the vehicle VA is traveling on the low μ road.

The driver may depress the acceleration pedal 44 in such a manner that the present acceleration opening degree Acct becomes equal to or larger than the threshold opening degree Accth with mistakenly grasping that the vehicle VA has entered the high μ road, even though the vehicle VA is travelling on the low μ road. In this case, when both of the value of the grasp flag Xund and the value of the road surface flag Xrmn have been set to "1", the CPU executes the operation priority TRC at Step 470 shown in FIG. 4. If the vehicle VA is travelling on the low μ road, the slip degree SD may increase under the operation priority TRC, and therefore, the slip degree SD has a high possibility of becoming equal to or larger than the fourth threshold degree SD4th. If this happens, the CPU sets both of the value of the grasp flag Xund and the value of the road surface flag Xrmn to "0". Therefore, the CPU starts executing the normal TRC at Step 450 shown in FIG. 4. In this manner, the DSECU 52 starts executing the normal TRC instead of the priority operation TRC even after it has once started executing the priority operation TRC, when the slip degree SD becomes equal to or larger than the fourth threshold degree SD4th while the DSECU is executing the priority operation TRC.

As described above, the DSECU 52 determines whether or not the driver is in the non-grasp state based on a change amount between the acceleration opening degree Acc and the start acceleration opening degree Acc1. In the case where the acceleration opening degree Acc becomes equal to or larger than the threshold opening degree Accth, the DSECU 52 executes the operation priority TRC if it was not determined that the driver was in the non-grasp state in the initial determination time period Thantei. This allows the DSECU 52 to determine whether or not the driver has been grasping the condition of the road surface and let/have the acceleration of the vehicle VA reflect the acceleration intention of the driver immediately after the acceleration operation time point.

The present disclosure is not limited to the above described embodiment, and can adopt/employs various modifications including modifications described below within a scope of the present disclosure.

First Modification Example

The DSECU 52 according to the above embodiment executes the normal TRC control when the slip degree SD becomes equal to or larger than the fourth threshold degree SD4th after the DSECU 52 has once started the operation priority TRC. A vehicle control device (hereinafter, referred to as "a first modification device") also executes the normal TRC (a present normal TRC) after the operation priority TRC in the same manner as the above embodiment except that the first modification device applies the driving force Dv in that normal TRC smaller than the driving force Dv applied in "the normal TRC (a previous normal TRC) executed before the operation priority TRC". Such a normal TRC after the operation priority TRC is referred to as "a strong/enhanced TRC".

When the slip degree SD becomes larger than the fourth threshold degree SD4th after the operation priority TRC was executed once, there is a high probability that the driver has deeply/greatly depressed the acceleration pedal 44 with the mistakenly grasping that the vehicle VA has entered the high μ road, despite that the vehicle VA is in fact travelling on the low μ road. In this case, the driving force Dv applied to the driving wheels has a high possibility of being too large through the operation priority TRC. In view of the above, the first modification device is configured to start executing the strong/enhanced TRC to immediately decrease the driving force Dv and the slip degree SD.

The CPU of the DSECU 52 of the first modification device executes a routine (hereinafter, referred to as "a first modification example routine") shown in FIG. 7 in place of the routine shown in FIG. 4 which the CPU of the DSECU 52 of the vehicle control device according to the above embodiment executes. In the first modification routine, the same Steps as the Steps shown in FIG. 4 are denoted with common step symbols for the Steps shown in FIG. 4, and description thereof is omitted.

Figure 7:
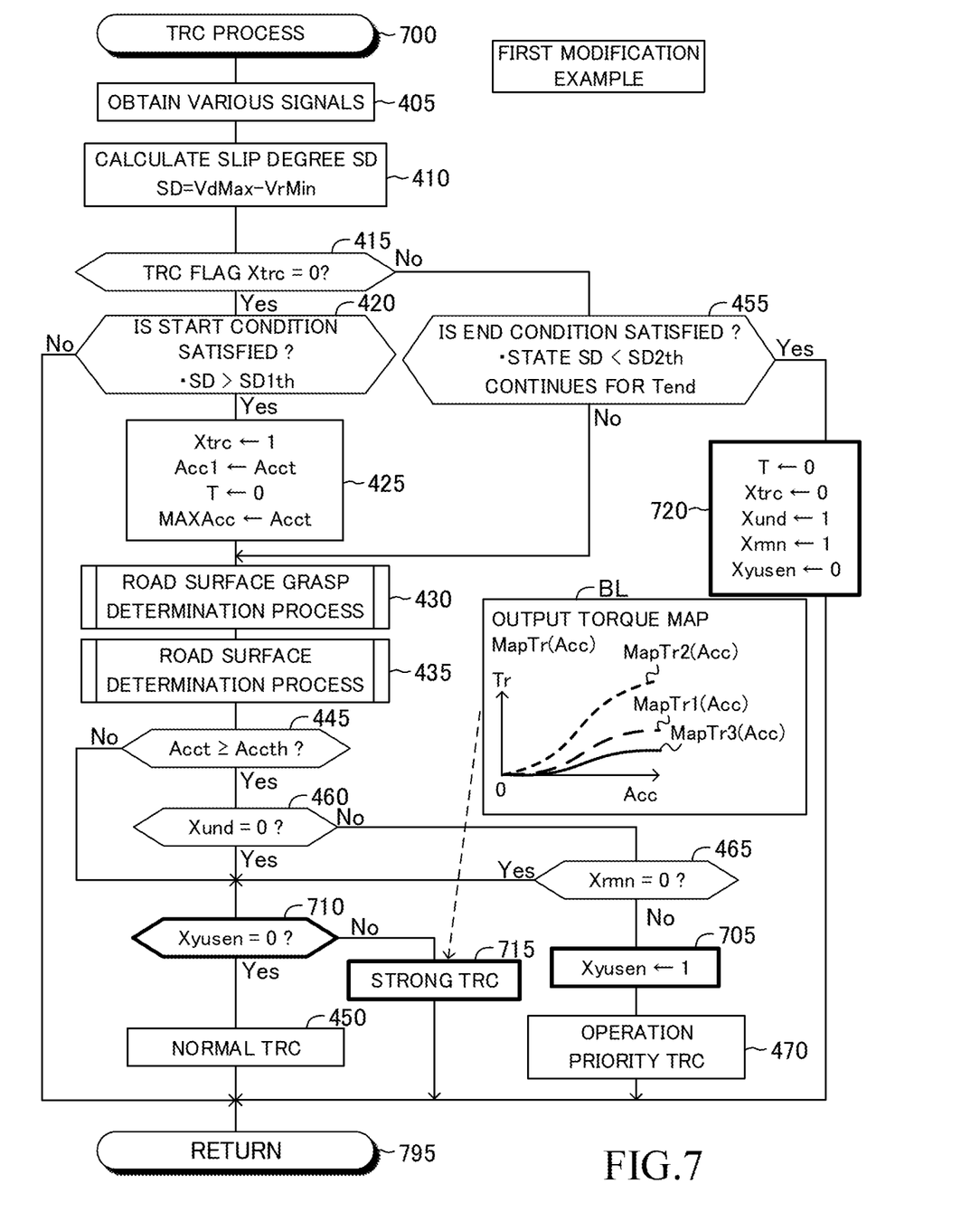
FIG. 7 is a flowchart showing a routine which the CPU of the vehicle control device (a first modification device) according to a first modification example executes.

When a predetermined timing has come, the CPU starts processes from Step 700 shown in FIG. 7 and executes processes of Steps following Step 405. When the present acceleration opening degree Acct is equal to or larger than the threshold opening degree Accth, and both of the value of the grasp flag Xund and the value of the road surface flag Xrmn have been set to "1", the CPU makes a "No" determination at Step 465 shown in FIG. 7 to proceed to Step 705.

The CPU sets a value of a priority flag Xyusen to "1" at Step 705. The priority flag Xyusen represents that the operation priority TRC has started in the currently executed traction control, when the value of the priority flag Xyusen is "1". The priority flag Xyusen represents that the operation priority TRC has never been executed in the currently executed traction control, when the value of the priority flag Xyusen is "O". When the end condition of the traction becomes satisfied, the value of the priority flag Xyusen is set to "0" at Step 720 as described later. The value of the priority flag Xyusen is also set to "0" through the initialization routine.

After executing the process at Step 705, the CPU proceeds to Step 470 shown in FIG. 7, and proceeds to Step 795 to tentatively terminate the present routine.

Thereafter, when the acceleration opening degree Acct becomes equal to or larger than the threshold opening degree Accth while the slip degree SD has been equal to or larger than the fourth threshold degree SD4th, the CPU makes a "Yes" determination at Step 445 shown in FIG. 7, and makes a "Yes" determination at Step 460 shown in FIG. 7 to proceed to Step 710. The CPU determines whether or not the value of the priority flag Xyusen has been set to "0" at Step 710. Since the value of the priority flag Xyusen has been set to "1" at this time, the CPU makes a "No" determination at Step 710 to proceed to Step 715.

The CPU executes the strong/enhanced TRC at Step 715, and proceed to Step 795 to tentatively terminate the present routine.

More specifically, at Step 715, the CPU acquires the target output torque Trtgt by applying the present acceleration opening degree Acct to a third output torque map MapTr3 (Acc) shown in a block BL of FIG. 8. Thereafter, the CPU transmits the acquired target output torque Trtgt to the engine ECU 48 as the TRC output instruction.

The third output torque map MapTr3(Acc) defines a relationship between the target output torque Trtgt (strongly suppressed control torque) and the acceleration opening degree Acc in such a manner that the target output torque Trtgt, which is defined to be smaller than the target output torque Trtgt (suppressed torque) defined by the first output torque map MapTr1(Acc) with respect to an arbitrary acceleration opening degree Acc, becomes larger as the acceleration opening degree Acc becomes larger.

In the strong/enhanced TRC, similarly to the normal TRC, when the slip degree SD is larger than a target slip degree SDtgt, the CPU transmits "the TRC brake instruction to apply predetermined brake force to the driving wheels 14RL and 14RR" to the brake ECU 42.

Accordingly, an engine output generated while the strong/enhanced TRC is being executed becomes smaller than the engine output generated while the normal TRC is being executed. Therefore, the driving force Dv generated while the strong TRC is being executed is smaller than the driving force Dv generated while the normal TRC is being executed.

On the other hand, when the value of the priority flag Xyusen has been set to "0" at a time point at which the CPU proceeds to Step 710 because the operation priority TRC has not been executed yet, the CPU makes a "Yes" determination at Step 710 to execute the process of Step 450 shown in FIG. 7. Thereafter, the CPU proceeds to Step 795 to tentatively terminate the present routine.

When the present acceleration opening degree Acct is smaller than the threshold opening degree Accth at a time point at which the CPU proceeds to Step 445 shown in FIG. 7, the CPU makes a "No" determination at Step 445 to proceed to Step 710 shown in FIG. 7.

When the end condition of the traction control has been satisfied, the CPU makes a "Yes" determination at Step 455 to proceed to Step 720. At Step 720, the CPU sets the priority flag Xyusen to "0", in addition to setting the timer and the flags described at Step 475 shown in FIG. 4, and proceeds to Step 795 to tentatively terminate the present routine.

The strong/enhanced TRC control is not limited to the above described method using the third-output torque map MapTr3. For example, when the slip degree SD has been larger than the target slip degree SDtgt, the CPU may transmit, to the brake ECU 42, "the TRC brake instruction to apply brake force larger than the brake force applied through the normal TRC" to the driving wheels 14RL and 14RR. Furthermore, the CPU may increase the pressure of the wheel cylinder 34RL and 34 RR in advance, when the CPU sets the value of the priority flag Xyusen to "1". Such a function is disclosed in Japanese Patent Application Laid-open No. 2008-94150.

Second Modification Example

The vehicle control device (hereinafter, referred to as "a second modification device") according to a second modification example is applied to a vehicle VA whose driving wheels are the front wheels 14FL and 14FR (i.e., a front wheel drive vehicle VA).

The CPU of the DSECU 52 of the second modification device executes substantially the same routine as the routine executed by the CPU of the above embodiment device. When the CPU of the DSECU 52 of the second modification device proceeds to Step 410 shown in FIG. 4, the CPU calculates the slip degree SD according to the equation (1). In this case, "VdMAX" in the equation (1) represents the wheel speed Vwfl of the driving wheel 14FL or the wheel speed Vwfr of the driving wheel 14FR, whichever is higher. In contrast, "VrMin" in the above equation (1) represents the wheel speed Vwrl of the driven wheel 14RL or the wheel speed Vwrr of the driving wheel 14RR, whichever is lower.

Third Modification Example

The vehicle control device (hereinafter, referred to as "a third modification device") according to a third modification example is applied to a vehicle VA whose driving wheels are the four wheels 14FL, 14FR, 14RL, and 14RR (i.e., a four wheels vehicle VA).

The CPU of the DSECU 52 of the third modification device executes substantially the same routine as the routine executed by the CPU of the above embodiment device. When the CPU of the DSECU 52 of the third modification device proceeds to Step 410 shown in FIG. 4, the CPU calculates the slip degree SD according to the equation (1). In this case, "VdMAX" in the equation (1) represents the maximum wheel speed among the wheel speeds Vwfl, Vwfr, Vwrl, and Vwrr of the respective wheels 14FL, 14FR, 14RL, and 14RR. In contrast, "VrMin" in the above equation (1) represents the minimum wheel speed among the wheel speeds Vwfl, Vwfr, Vwrl, and Vwrr of the respective wheels 14FL, 14FR, 14RL, and 14RR.

Furthermore, the CPU may calculate the slip degree SD without using the equation (1). For example, the CPU uses a driving wheels average speed VdAve in place of the driving wheels maximum speed VdMAX, and a driven wheels average speed VrAve in place of the driven wheels minimum speed VrMin. The driving wheels average speed VdAve is an average of the wheel speeds of the two driving wheels. The driven wheels average speed VrAve is an average of the wheel speeds of the two driven wheels. Such an approach/manner is disclosed in Japanese Patent Application Laid-open No. 2009-248633. In addition, the CPU may calculate the slip degree SD by dividing "a value acquired according to the equation (1)" by the driven wheels minimum speed VrMin.

In the above embodiment, the threshold opening degree Accth employed at Step 445 is the same value as the threshold opening degree Accth employed at Step 605. However, the threshold opening degree Accth employed at Step 445 may be different from the threshold opening degree Accth employed at Step 605. In this case, it is preferable that the threshold opening degree Accth employed at Step 605 be smaller than the threshold opening degree Accth employed at Step 445.

In the above embodiment, the DSECU 52 determines whether the road on which the vehicle VA is travelling is the high μ road or the low μ road based on the slip degree SD in order to set the value of the road surface flag Xrmn based on the determination result. However, the method for determining whether the road is the high μ road or the low μ road is not limited to the above described method. In some embodiments, the vehicle control device comprises a camera device which obtains image data of the road surface by photographing the road surface. The DSECU 52 determines that the road is the low μ road when the number of pixels with luminance higher than threshold luminance, which exclude pixels corresponding to the white line on the road, is equal to or larger than a predetermined number in the camera image. This is because it is considered that, in general, a reflectance of the low μ road is higher than that of the high μ road, and "the luminance of the pixel corresponding to a point which reflects light" is higher than the threshold luminance.

What is claimed is:

1. A vehicle control device comprising:
   an acceleration operation amount sensor for measuring an operation amount of an accelerator varied by a driver; and
   a control device for controlling a driving device of a vehicle in such a manner that driving torque which the driving device applies to driving wheels of the vehicle coincides with normal torque which is proportional to the operation amount,
   wherein the control device is configured to:
   start a traction control for controlling the driving device in such a manner that the driving torque coincides with suppressed torque which is less than the normal torque and which is proportional to the operation amount, when a slip index value representing a slip degree of the driving wheels satisfies a predetermined traction control start condition;
   determine that the driver does not grasp a condition of a road surface, when the driver's actions satisfy a specific condition in an initial time period, the driver's action being a condition which the operation amount is not considered to satisfy when the driver has been grasping the condition of the road surface;

during a time period in which the traction control is being executed, start an operation priority control at an acceleration operation time point at which the operation amount becomes equal to or greater than a threshold operation amount, the operation priority control being a control for controlling the driving device in such a manner that the driving torque coincides with acceleration priority torque which is greater than the suppressed torque and equal to or less than the normal torque and which is proportional to the operation amount;

determine, in the initial time period, that the operation amount satisfies the specific condition when the operation amount becomes equal to or greater than a first threshold acquired by adding a first predetermined amount to a start operation amount which is the operation amount at a start time point; and determine that the driver grasps the condition of the road surface, when the operation amount becomes less than a second threshold acquired by subtracting a second predetermined amount from a maximum value of the operation amount obtained in a period from the start time point during the initial time period, even after the operation amount has once become equal to or greater than the first threshold so as to satisfy the specific condition.

2. The vehicle control device according to claim 1, wherein the control device is configured to determine whether or not the road surface is a low μ road based on the slip index value, and not to start the operation priority control at the acceleration operation time point, if the control device has determined that the road surface is the low μ road before the acceleration operation time point, even if the control device has not determined that the driver does not grasp the condition of the road surface.

3. The vehicle control device according to claim 2, wherein the control device is configured to determine that the road surface is not the low μ road when the slip index value is equal to or less than a predetermined high μ road determination threshold at the acceleration operation time point.

4. The vehicle control device according to claim 2, wherein the control device is configured to determine that the road surface is the low μ road when the slip index value becomes equal to or greater than a predetermined low μ road determination threshold at and after the start time point.

5. The vehicle control device according to claim 1, wherein the control device is configured to stop the operation priority control and start an enhanced traction control for controlling the driving device in such a manner that the driving torque coincides with strongly suppressed control torque which is less than the suppressed torque and which becomes greater as the operation amount becomes greater, when the slip index value becomes equal to or greater than a stop slip threshold value while the operation priority control is being executed.

* * * * *